United States Patent
Yamada et al.

(10) Patent No.: US 6,458,295 B1
(45) Date of Patent: Oct. 1, 2002

(54) PHOSPHORS, AND RADIATION DETECTORS AND X-RAY CT UNIT MADE BY USING THE SAME

(75) Inventors: Hiromichi Yamada, Tokyo; Makoto Sato; Ichiro Miura, both of Chiba-ken; Motomichi Doi, Ibaraki-ken; Takaaki Kobiki, Chiba-ken, all of (JP)

(73) Assignee: Hitachi Medical Corporation (JP)

( * ) Notice: Subject to any disclaimer, the term of this patent is extended or adjusted under 35 U.S.C. 154(b) by 0 days.

(21) Appl. No.: 09/582,569

(22) PCT Filed: Dec. 22, 1998

(86) PCT No.: PCT/JP98/05806

§ 371 (c)(1),
(2), (4) Date: Jun. 26, 2000

(87) PCT Pub. No.: WO99/33934

PCT Pub. Date: Jul. 8, 1999

(30) Foreign Application Priority Data

Dec. 24, 1997 (JP) ............................................. 9-355073

(51) Int. Cl.$^7$ ........................... C09K 11/00; G01T 1/20; A61B 6/03
(52) U.S. Cl. ................................ 252/301.4 R; 501/152; 250/361 R; 250/363.04; 250/483.1; 250/378; 250/4; 250/19; 250/21
(58) Field of Search ............................... 378/4, 19, 21; 250/361 R, 363.04, 483.1; 501/152; 252/301.4 R (56) References Cited

U.S. PATENT DOCUMENTS 3,699,478 A * 10/1972 Pinnow et al. ................. 250/71
5,998,925 A * 12/1999 Shimizu et al. ............. 313/503
6,013,199 A * 1/2000 McFarland et al. ... 252/301.4 R

FOREIGN PATENT DOCUMENTS

| JP | 49106486 A | * 10/1974 |
| JP | 60-4856 B | 11/1981 |
| JP | 59-27283 A | 2/1984 |
| JP | 63-59436 A | 3/1988 |
| JP | 4288393 A | * 10/1992 |
| JP | 4289483 A | * 10/1992 |

OTHER PUBLICATIONS

Blasse et al.; "A New Phosphor for Flying–Spot Cathode–Ray Tubes for Color Television"; Applied Physics Letters, pp53–55; Jul. 15, 1967.

Sobon et al.; "Growth and Properties of Lanthanum Oxysulfide Crystals"; Journal of Applied Physics; pp3049–3053; Jul. 1971.

* cited by examiner

Primary Examiner—C. Melissa Koslow
(74) Attorney, Agent, or Firm—Pennie & Edmonds LLP (57) ABSTRACT

A novel phosphor represented by the general formula $$(Gd_{1-x}Ce_x)_3Al_{5-y}Ga_yO_{12}$$

(wherein x and y are values falling in the ranges of $0.0005 \leq x \leq 0.02$, and $0<y<5$.) was provided. The phosphor has a high luminous efficiency when Al and Ga are coexistent in the Gd-system phosphor. In particular, the phosphor with the Ga content (y) in the range of 2–3 has a luminous efficiency of twice the conventional phosphor. A radiation detector using this phosphor as ceramic scintillator is capable of obtaining a high luminous output and a very small afterglow.

10 Claims, 6 Drawing Sheets

PHOSPHORS, AND RADIATION DETECTORS AND X-RAY CT UNIT MADE BY USING THE SAME

BACKGROUND OF THE INVENTION

The present invention relates to a rare-earth element oxide phosphor suitable for use in a radiation detector for detecting X-rays, γ rays and the like and particularly for use in the radiation detector of an X-ray CT apparatus, a positron camera or the like. The present invention also relates to a radiation detector and an X-ray CT apparatus using the phosphor.

As the radiation detectors used in X-ray CT apparatuses and the like there have conventionally been used ones combining a xenon gas chamber or BGO (bismuth germanium oxide) single crystal and a photomultiplier tube or combining CsI : Tl single crystal or $CdWO_4$ single crystal and a photodiode. Properties generally required of a scintillator material used in a radiation detector include short afterglow, high luminous efficiency, high X-ray stopping power and chemical stability. The aforementioned single crystal phosphor, however, has variations in its characteristics and drawbacks in any of deliquescence, cleavage, afterglow (emission after X-ray irradiation is stopped) phenomenon, luminous efficiency and the like.

In recent years, however, rare-earth-system phosphors with high radiation-to-light conversion efficiencies have been developed as scintillators and radiation detectors combining such a phosphor with a photodiode have been put into practical use. Rare-earth phosphors consist of rare-earth element oxide or rare-earth element oxysulfide as base material and an activator as luminescence component. As a rare-earth element oxide phosphor, a phosphor including yttrium oxide or gadolinium oxide as base material has been proposed (Japanese Patent Publication No. 63(1988)-59436, Japanese Unexamined Patent Publication No.3 (1991)-50991, for example). As a rare-earth element oxysulfide phosphor, phosphors including Pr or Ce as the activator have been proposed (Japanese Patent Publication No. 60(1985)-4856).

Although these phosphors include a phosphor having a good luminous efficiency, a phosphor having a shorter afterglow (a time required for light to attenuate to $\frac{1}{10}$ after X-ray irradiation is stopped) is required depending on its application. Specifically, large afterglow of scintillators used for detecting X-rays is particularly problematic in X-ray CT applications, for example, because it makes information-carrying signals indistinct in the time-axis direction. Very small afterglow is therefore required for scintillator material. However, the above-mentioned conventional rare-earth-system phosphors do not satisfy such requirement in afterglow even though they are high in luminous efficiency.

Although YAG-system phosphors ($Y_3(Al,Ga)_5O_{12}$) have been also known as a phosphor for electron beams (Applied Physics Letters, Jul. 15, 1967), these phosphors have low X-ray stopping power and can not be practiced in an X-ray detector.

With regard to photodetectors, the peak response wavelength of PIN photodiodes, which is currently used as photodetectors in radiation detectors employed in X-ray CT and the like, is in the red region. In order to improve detection efficiency, phosphors having good wavelength matching with the PIN photodiodes are demanded.

An object of the present invention is therefore to provide a phosphor with very short afterglow and high luminous efficiency that is particularly useful as a scintillator in X-ray CT and the like. Another object of the present invention is to provide a radiation detector that is equipped with the phosphor and is high in detection efficiency. Another object of the present invention is to provide an X-ray CT apparatus that is equipped with a radiation detector with very small afterglow and high luminous efficiency as a radiation detector and can provide high-resolution, high-quality tomographic images.

DISCLOSURE OF THE INVENTION

In order to achieve the foregoing objects, the inventors conducted an intense study regarding rare-earth element oxide phosphors having Ce as luminous component and, discovering as a result that a phosphor having $Gd_3Al_{5-y}Ga_yO_{12}$ as base material and Ce as an activator (luminous component) has high luminous efficiency and markedly low afterglow, they arrived at present invention. The inventors also conducted an intense study regarding a process for manufacturing the phosphor. As a result, they found that a phosphor having markedly high luminous efficiency can be obtained when potassium compounds are used as flux components for baking starting materials therewith to make scintillator powder.

Specifically, the phosphor of the present invention is a phosphor represented by the general formula $(Gd_{1-z-x}L_zCe_x)_3Al_{5-y}Ga_yO_{12}$ where L represents La or Y, and x, y and z are values falling in the ranges of $0 \leq z < 0.2$, $0.0005 \leq x \leq 0.02$, $0 < y < 5$.

The phosphor of the present invention is a phosphor represented by the above-described general formula and containing a very small amount of potassium.

The phosphor of the present invention is a phosphor represented by the above-described general formula and obtainable by sintering the press-molded starting materials, or by baking starting materials together with a flux component to make scintillator powder and sintering the scintillator powder after the scintillator powder is press molded.

The phosphor of the present invention includes $Gd_3Al_{5-y}Ga_yO_{12}$ as base material and Ce as an activator (luminous component). It absorbs radiation such as X-rays and gamma rays, exhibits yellowish emission due to Ce ion. When such a phosphor is used as a scintillator of a radiation detector, matching with the photodiode is relatively good and a luminous output can be obtained that is 1.6 times or more than that of the $CdWO_4$ currently widely used as a scintillator for X-ray CT.

The phosphor is markedly low in afterglow since it contains Ce as luminous ion and its emission attenuates to 10% by about 220 ns (nano-seconds) after X-ray irradiation is stopped and to $2 \times 10^{-5}$ by about 30 ms. Generally phosphor afterglow includes primary afterglow and secondary afterglow (long-afterglow component). In X-ray CT, the secondary afterglow is problematic because information-carrying signals (X-ray) become indistinct in the time-axis direction. The phosphor is markedly low in the secondary afterglow (afterglow after 30 ms), i.e., $2 \times 10^{-5}$, and therefore excellent in properties suitable for scintillators of X-ray CT.

In the phosphor of the present invention, part of the element Gd (gadolinium) can be replaced with the element La (lanthanum) and/or the element Y (yttrium). In this case, the phosphor remains markedly low in afterglow. However, the content of La or Y (ratio z replacing Gd) should be less than 0.2, preferably less than 0.1, since as the content increases, the luminous efficiency and X-ray stopping power are degraded. The luminous efficiency and X-ray stopping power can be maximized when La or Y is not included.

By using Al (aluminum) together with Ga (gallium), high luminous efficiency can be obtained. According to the inventors' investigation, it was found that when Gd-oxide-system phosphors containing Ce as luminous component include only one of Al and Ga, that is, base material is $Gd_3Al_5O_{12}$, or $Gd_3Ga_5O_{12}$, they do not exhibit practical amount of emission contrary to YAG-system. However, once Al and Ga were coexistent in the phosphor, the phosphor becomes to exhibit emission and, in addition, have markedly low afterglow. The total content of Al (5−y) and Ga (y) is 5 to (Gd+L+Ce)=3 in atomic ratio, and y satisfies 0<y<5, preferably 1.7<y<3.3, more preferably 2≦y≦3. When the Al content and Ga content are within the range of from 1.7 to 3.3 respectively, a luminous output that is 1.5 times or more than that of the $CdWO_4$ can be obtained.

Ce (Cerium) is an element that serves as an activator (luminous component) in the phosphor of the present invention. The Ce content (x) in (Gd+L+Ce) for generating Ce emission is 0.0005 or greater, preferably 0.001 or greater. The Ce content (x) is defined as 0.05 or less for applications requiring high luminous output because a luminous output 1.5 times that of CdWOO cannot be obtained when the Ce content (x) exceeds 0.05. Preferably, the Ce content (x) in (Gd+L+Ce) is defined as 0.02 or less, more preferably 0.015 or less.

While the aforementioned elements Gd, Al, Ga and Ce are indispensable element in the phosphor of the present invention, it may contain a very small amount of potassium in addition to these elements. The luminous efficiency can be further increased by addition of such a very small amount of potassium, for example, 10 wtppm or more, preferably in the range of from 50 to 500 wtppm, more preferably-in the range of from 100 to 250 wtppm. When a phosphor including potassium in the above-mentioned range is used as a scintillator of a radiation detector, the luminous output twice or more than that of the $CdWO_4$ can be obtained.

The phosphor of the present invention may contain other elements inevitably included therein. For example, when $Gd_2O_3$ is used as a starting material for manufacturing the phosphor of the present invention, $Gd_2O_3$ having purity of 99.99% may include 5 wtppm or less of such impurities as $Eu_2O_3$, $Tb_4O_7$ and, therefore, the phosphor may include such impurities. The phosphors including such impurities are also within the scope of the present invention.

The phosphor of the present invention is not particularly limited with regard to crystal morphology. It may be single crystal or polycrystal. The polycrystal is preferred in view of easiness of producing and small variation in characteristics. The process for producing other phosphors as single crystal reported in J. Appl. Phys., vol.42, p3049 (1971) can be applied as the process for preparing the phosphor of the present invention as single crystal. The phosphor is obtained as a sintered material by hot-pressing (HP) process which adds an appropriate sintering agent to scintillator powder (starting material) and presses it under conditions of a temperature of 1,400–1,700° C., and a pressure of about 300–1,400 atm, or by hot-isostatic pressing (HIP) process under the same condition as that of the HP. This enables the phosphor to be obtained as a dense sintered body of high optical transmittance. Since the phosphor of the present invention is cubic crystal and not anisotropic in refractive index, it becomes to have high optical transmittance when it is made into a sintered body.

The phosphor (scintillator powder) before sintering can be prepared as follows: mixing $Gd_2O_3$, $Ce_2(C_2O_4)_3 \cdot 9H_2O$, $Al_2O_3$ and $Ga_2O_3$, for example, as starting material powder in a stoichiometric ratio, occasionally adding an appropriate flux component, and conducting baking in an alumina crucible at a temperature of from 1,550° C. to 1,700° C. for several hours.

The flux component is added in order to lower the melting temperature of the starting materials and expedite crystallization. As the flux component, $BaF_2$ used for sintering the YA-systemphosphor and potassium compounds such as potassium salts can be used alone or as a mixture. The potassium compounds such as $K_2SO_4$, $KNO_3$, $K_2CO_3$, $K_3PO_4$ are preferable.

As a result of the inventors' investigation concerning the flux components used for producing the phosphor of the present invention, it was found that when the starting materials were baked using potassium compounds as the flux component, phosphors having markedly high luminous efficiency can be obtained. It is considered that the luminous efficiency is enhanced because the potassium compounds expedite crystallization of $Gd_3(Al, Ga)_5O_{12}$ phase during baking and a very small amount of the compounds is included into the crystal.

The amount of the potassium compounds used as the flux may be 0.2–1.8 mol as potassium atom to 1mol of the phosphor to be produced, preferably 0.4–1.6 mol, more preferably 0.8–1.2 mol. With regard to compounds containing 2 potassium atoms in a molecule, e.g., potassium sulfate, the amount may be 0.1–0.9 mol as potassium atom to 1 mol of the phosphor to be produced, preferably 0.2–0.8 mol, more preferably 0.4–0.6 mol.

When the amount of the flux is less or more than the aforementioned range, deposition of crystal having another crystal phases which are different from the expected crystal phase $(Gd_3(Al,Ga)_2O_{12})$, for example $GdAlO_3$, tend to increase. In the aforementioned range of the potassium compound as the flux, a very small amount (500 wtppm or less) of potassium is included in the produced phosphor and, as a result, the phosphor has high luminous efficiency.

The sintered body is prepared as aforementioned by using the scintillator powder baked in this way. The phosphor produced in this. manner is dense, high in optical transmittance, and small variations in its characteristics. A radiation detector of large luminous output can therefore be obtained.

Although the phosphor of the present invention can be used in intensifying screens, fluorescent screens, scintillators and other general phosphor applications, it is particularly suitable for use in X-ray CT detectors, which require high luminous output and small afterglow.

The radiation detector of the present invention is equipped with a ceramic scintillator and a photodetector for detecting scintillator emission. The phosphor described in the foregoing is used as the ceramic scintillator. A photodiode such as a PIN photodiode is preferably used as the photodetector. These photodiodes have high sensitivity and short response. Moreover, as they have wavelength sensitivity from the visible light to near infrared region, they are suitable for their good wavelength matching with the phosphor of the present invention.

The X-ray CT apparatus of the present invention is equipped with an X-ray source, an X-ray detector disposed facing the X-ray source, a revolving unit for holding the X-ray source and the X-ray detector and revolving them about the object to be examined, and image reconstruction means for reconstructing a tomographic image of the object based on the intensity of the X-rays detected by the X-ray detector, which CT apparatus uses as the X-ray detector a radiation detector combining the aforesaid phosphor and a photodiode.

High-quality, high-resolution images can be obtained by utilizing this X-ray detector because the high X-ray detection rate makes it possible to achieve an approximate doubling of sensitivity compared with an X-ray CT apparatus using a conventional scintillator (such as $CdWO_4$) and also because its afterglow is extremely small.

BEST MODE FOR CARRYING OUT THE INVENTION

The X-ray CT apparatus equipped with the radiation detector of the present invention will now be explained with reference to an embodiment.

Figure 1:
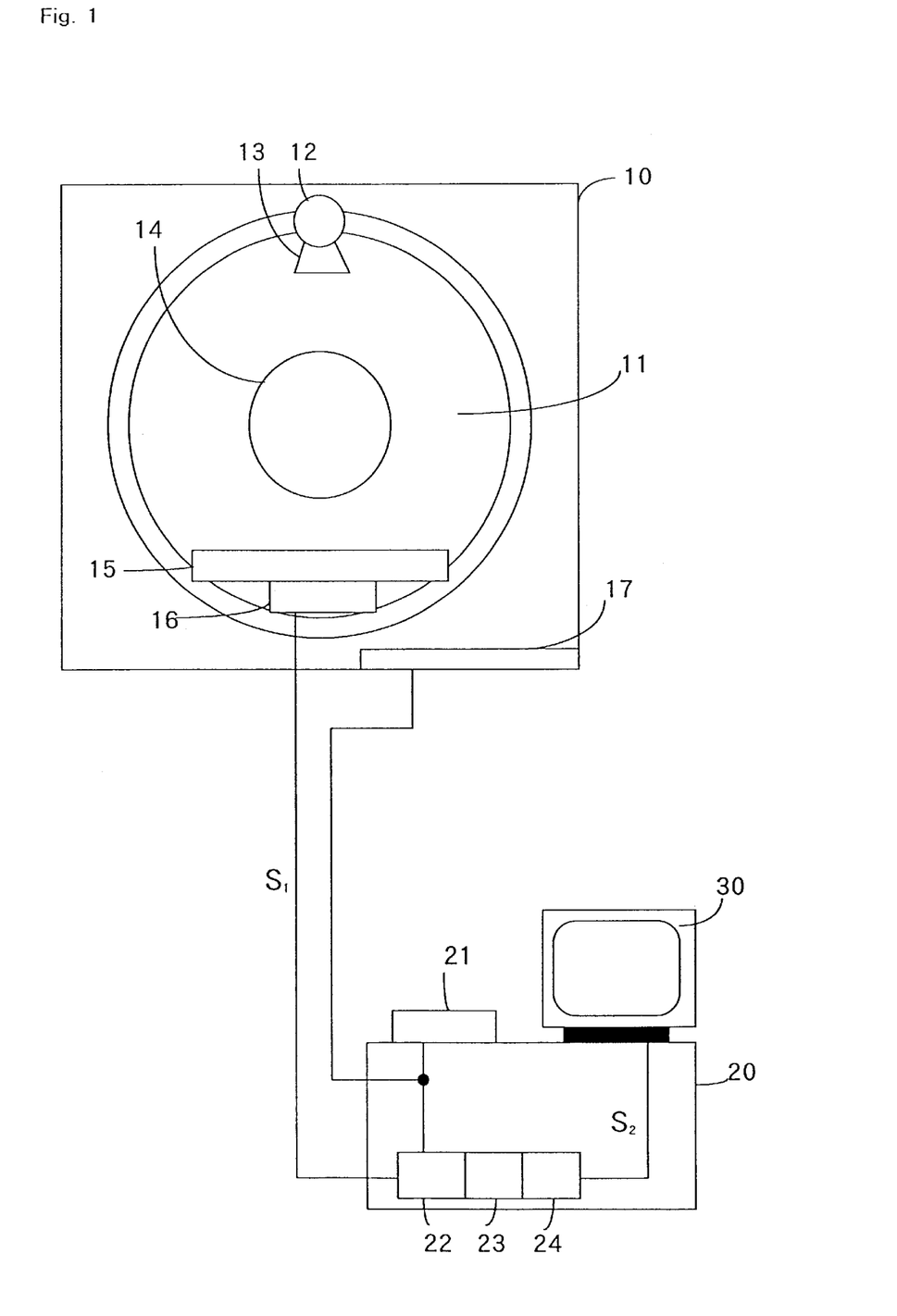
FIG. 1 is a diagram showing the configuration of an X-ray CT apparatus that is an embodiment of the present invention.

FIG. 1 is a schematic view of an X-ray CT apparatus of the present invention. The apparatus comprises a scanner gantry section 10 and an image reconstruction section 20. The scanner gantry section 10 comprises a revolving disk 11 having an open section 14 into which the patient (the object to be examined) is conveyed, an X-ray tube 12 mounted on the revolving disk 11, a collimator 13 attached to the X-ray tube 12 for controlling the direction of the X-ray beam, an X-ray detector 15 mounted on the revolving disk 11 to face the X-ray tube 12, a detector circuit 16 for converting the X-rays detected by the X-ray detector 15 into a prescribed signal, and a scan control circuit 17 for controlling revolution of the revolving disk 11 and the width of the X-ray beam.

The image reconstruction section 20 comprises an input device 21 for inputting the patient's name, date and time of the examination, examination conditions and the like, an image processing circuit 22 for processing measurement data S1 sent from the detector circuit 16 to effect CT image reconstruction, image information adding section 23 for adding to the CT image produced by the image processing circuit 22 the patient's name, date and time of the examination, examination conditions and other information input through the input device 21, and a display circuit 24 for adjusting the display gain of the image-information-added CT image signal S2 and outputting it to a display monitor 30.

X-rays are radiated from the X-ray tube 12 of the X-ray CT apparatus with the patient resting on a table (not shown) installed in the open section 14 of the scanner gantry section 10. The X-rays are imparted directivity by the collimator 13 and are detected by the X-ray detector 15. By revolving the revolving disk 11 around the patient at this time, the X-rays are detected while changing the direction of the X-ray beam. In the case of a full scan, one scan is defined as one rotation (360 degrees) of the revolving disk. The image of one slice is reconstructed from the measurement data for one scan. The tomographic image produced by the image reconstruction section 20 is displayed on the display monitor 30.

Figure 2:
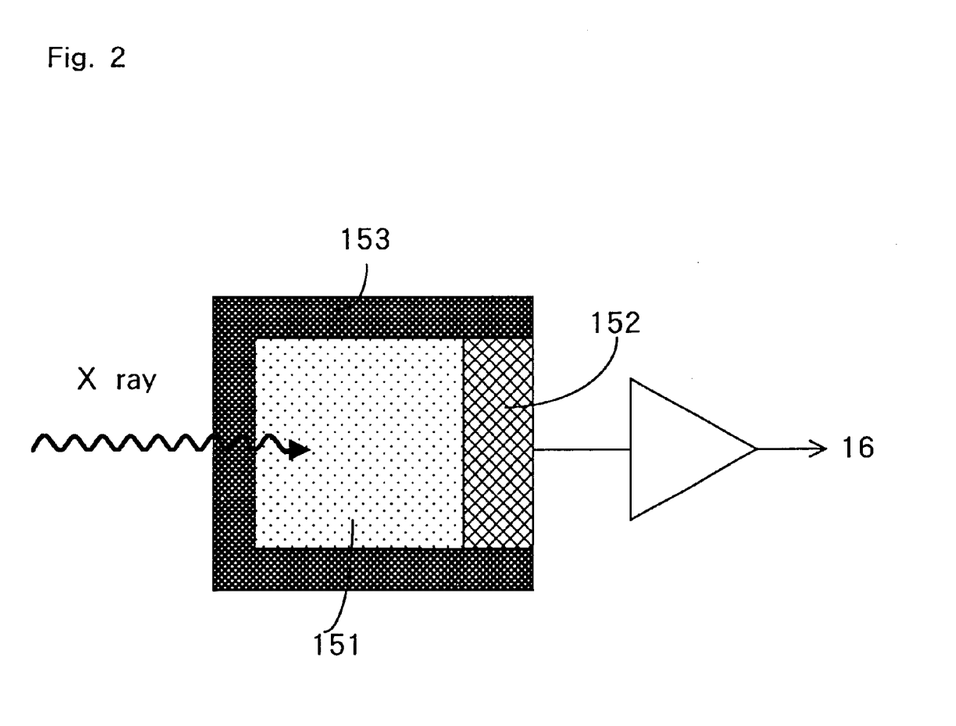
FIG. 2 is a diagram showing the structure of a radiation detector (X-ray detector) that is an embodiment of the present invention.

The X-ray detector 15 has many (e.g., 960) scintillator elements, each a combination of a scintillator and a photodiode, disposed in an arcuate array. As shown in FIG. 2, each scintillator element has a structure combining a scintillator 151 and a PIN photodiode 152, and the p-layer side of the PIN photodiode 152 is connected to the detector circuit 16. The whole element other than the p-layer of the PIN photodiode 152 is covered by a shield 153 to prevent light emitted by the scintillator 151 from escaping to the exterior. The shield 153 is made of a material such as aluminum that passes X-rays and reflects light.

The scintillator 151 is a phosphor that emits light upon absorbing X-rays reaching it from the X-ray tube 12 after passing through the patient. It consists of the phosphor of the present invention. The scintillator 151 is higher in luminous output than conventional scintillators. Moreover, since its emission has emission peaks straddling the high-photosensitivity wavelength region of the PIN photodiode 152, it is photoelectrically converted by the PIN photodiode 152 with high efficiency.

During the taking of tomographic images with this configuration, the X-ray tube 12 continuously emits a fan beam of X-rays as the X-ray tube executes one revolution about once every 1 second to 4 seconds. During this period, the X-rays passing through the object are detected, with the detector circuit 16 side being turned ON and OFF several hundred times. An X-ray detector 15 with high output and short afterglow is therefore required. As the X-ray CT apparatus of the invention utilizes an X-ray detector 15 with high output and low afterglow, it can provide high-quality CT images. Owing to the high luminous output, moreover, the same image can be obtained with a smaller amount of X-rays, whereby the X-ray dosage received by the patient can be reduced.

Although the foregoing explanation with reference to the drawing was made regarding an X-ray CT apparatus using an X-ray tube, the X-ray source is not limited to an X-ray tube but can instead be a beam-type X-ray device that effects beam scanning.

EXAMPLES

Example 1

$Gd_2O_3$, $Ce_2(C_2O_4)_3 \cdot 9H_2O$, $Al_2O_3$ and $Ga_2O_3$ were used as raw materials, and they were mixed with a flux component, $BaF_2$. The mixture was packed in an alumina crucible, and, after covering the crucible, subjected to baking at 1,600° C. for 3 hours. The baked materials were treated with 2N $HNO_3$ aqueous solution for 1 hour to remove the flux component, washed with water, and then dried to obtain scintillator powder.

The scintillator powder obtained in this manner was press molded and, then, the molded material was subjected to hotpressing under the condition of 1700° C. and 500 atm. to obtain sintered body.

According to the method described above, $(Gd_{1-x}Ce_x)_3Al_3Ga_2O_{12}$ ceramic scintillators with different Ce concentrations (x) were produced (thickness of 2.5 mm). A detector was produced by using each scintillator together with a photodiode, and placed at a distance of 15 cm from an X-ray source (120 kV, 0.5 mA), and its luminous output was measured.

Figure 3:
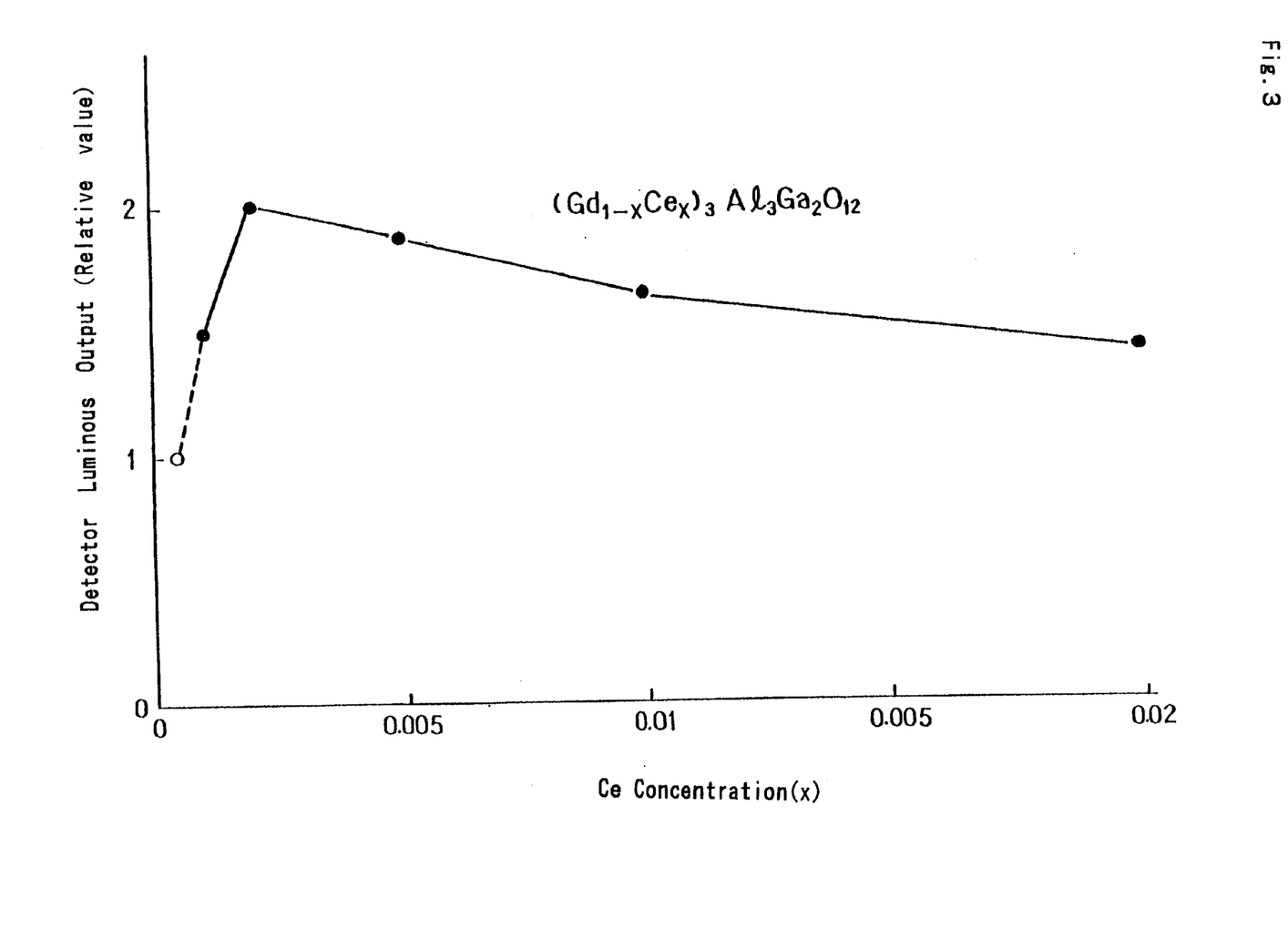
FIG. 3 is a graph showing how detector luminous output varies with Ce concentration in a phosphor of the present invention.

The results are shown in FIG. 3, which are plotted with luminous output as ordinate and Ce concentration (x) as abscissa. The luminous output was represented with relative values based on the luminous output of a $CdWO_4$ detector defined to be 1.

As clearly seen from the results shown in the figure, luminous output 1.5 times or more than that of the $CdWO_4$ detector could be obtained in the range of Ce concentration (x) 0.005–0.015, and 2.0 times or more in the Ce concentration (x) of 0.002.

Example 2

Figure 4:
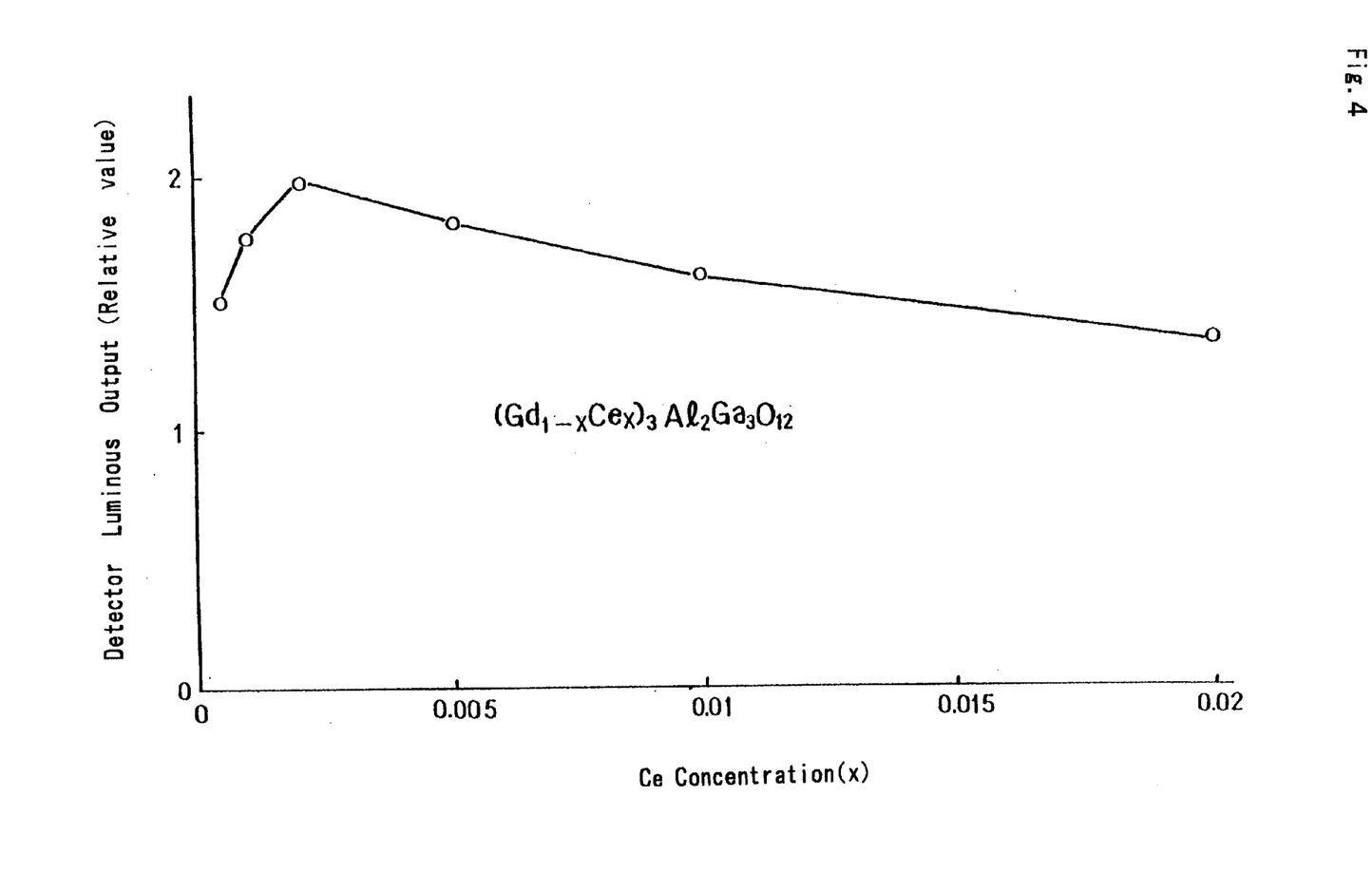
FIG. 4 is a graph showing how detector luminous output varies with Ce concentration in a phosphor of the present invention.

$Gd_2O_3$, $Ce_2(C_2O_4)_3 \cdot 9H_2O$, $Al_2O_3$ and $Ga_2O_3$ were used as raw materials, and they were mixed with a flux component, $BaF_2$. Then, $(Gd_{1-x}Ce_x)_3Al_2Ga_3O_{12}$ ceramic scintillators with different Ce concentrations (x) were produced (thickness of 2.5 mm) in the same manner as in Example 1. A detector was produced by using each scintillator together with a photodiode, and its luminous output was measured in the same manner as in Example 1. The results are shown in FIG. 4, which are plotted with luminous output as ordinate and Ce concentration (x) as abscissa.

As clearly seen from the results shown in the figure, in this Example also luminous output 1.5 times or more than that of the $CdWO_4$ detector could be obtained in the range of Ce concentration (x) 0.005–0.015, and 1.9 times or more in the Ce concentration (x) of 0.002.

Example 3

Figure 5:
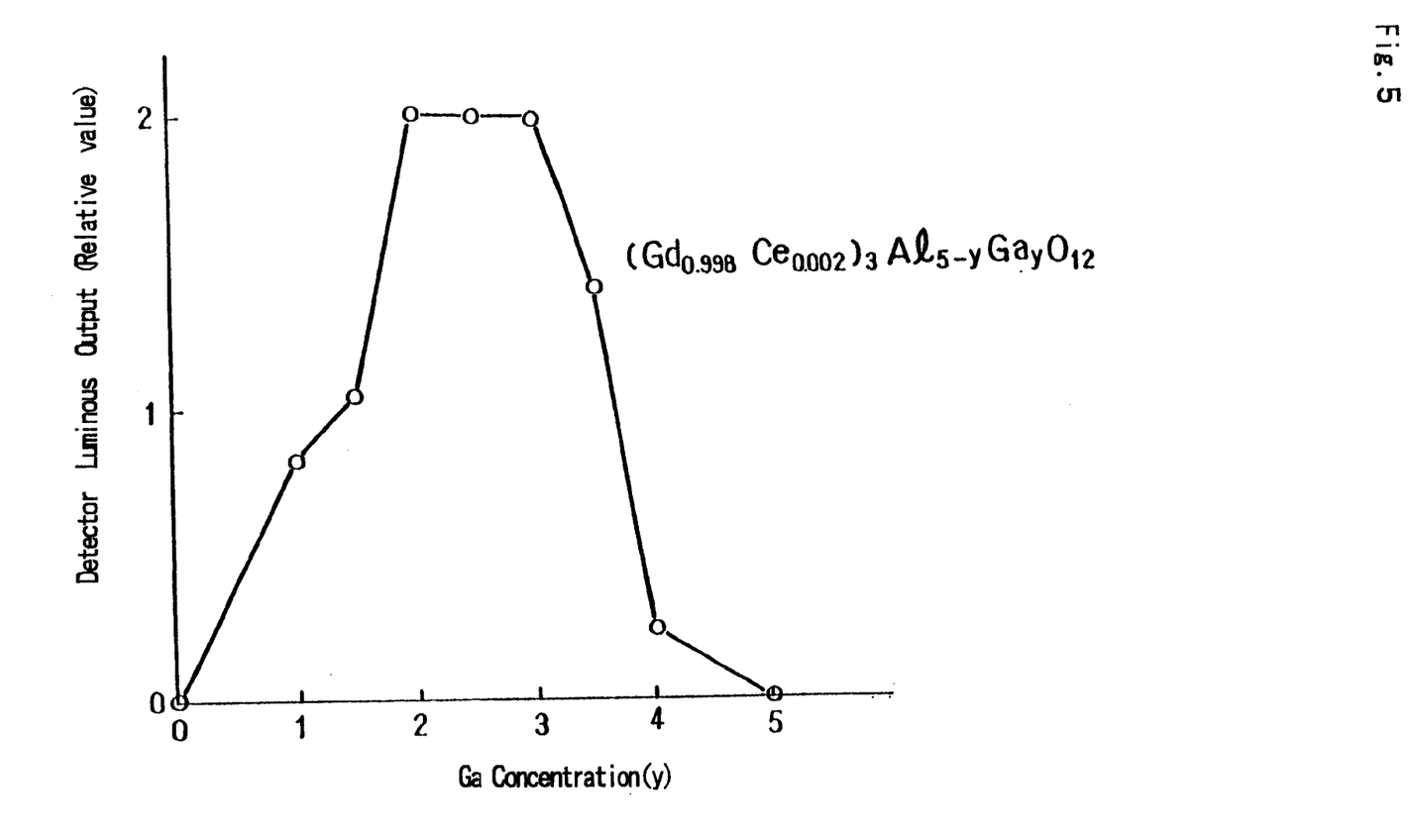
FIG. 5 is a graph showing how detector luminous output varies with Ga concentration in a phosphor of the present invention.

$Gd_2O_3$, $Ce_2(C_2O_4)_3 \cdot 9H_2O$, $Al_2O_3$ and $Ga_2O_3$ were used as raw materials, and they were mixed with flux components, $BaF_2$. Then, $(Gd_{0.998}Ce_{0.002})_3Al_{5-y}Ga_yO_{12}$ ceramic scintillators with different Al and Ga concentrations (y) were produced (thickness of 2.5 mm) in the same manner as in Example 1. A detector was produced by using each scintillator together with a photodiode, and its luminous output was measured in the same manner as in Example 1. The results are shown in FIG. 5, which are plotted with ere luminous output as ordinate and Ga concentration (y) as abscissa.

As clearly seen from the results shown in the figure, while little emission was observed when only one of Al and Ga was included in the scintillator, emission became to be observed both of Al and Ga were included. When Ga concentration (y) was in the range of 2–3, the highest luminous output (twice that of the $CdWO_4$ detector) could be obtained.

Comparative Example 1

$Gd_2O_3$, $La_2O_3$, $Ce_2(C_2O_4)_3 \cdot 9H_2O$, $Al_2O_3$ and $Ga_2O_3$ were used as raw materials, and they were mixed with flux components, $BaF_2$. Then, $(Gd_{0.898}La_{0.1}Ce_{0.002})_3Al_3Ga_2O_2$ ceramic scintillator was produced (thickness of 2.5 mm) in the same manner as in Example 1. A detector was produced by using the scintillator together with a photodiode, and its luminous output was measured in the same manner as in Example 1. As a result, the luminous output was 0.8 based on that of the $CdWO_4$ detector, which was very lower than in the case that La was not added.

Comparative Example 2

$Gd_2O_3$, $Y_2O_3$, $Ce_2(C_2O_4)_3 \cdot 9H_2O$, $Al_2O_3$ and $Ga_2O_3$ were use and they were mixed with flux components, $BaF_2$. Then, $(Gd_{0.898}Y_{0.1}Ce_{0.002})_3Al_3Ga_2O_{12}$ ceramic scintillator was produced (thickness of 2.5 mm) in the same manner as in Example 1. A detector was produced by using the scintillator together with a photodiode, and its luminous output was measured in the same manner as in Example 1. As a result, the luminous output was 1.36, based on that of $CdWO_4$, which was lower than in the case where Y was not added.

Example 4

$Gd_2O_3$, $Ce_2(C_2O_4)_3 \cdot 9H_2O$, $Al_2O_3$ and $Ga_2O_3$ were used as raw materials, and they were mixed in stoichimetric ratio. Potassium sulfate was added to the mixture as a flux component, and the mixture was packed in an alumina crucible, and, after covering the crucible, subjected to baking at 1,600° C. for 2 hours. The amount of the flux was 0.5 mol per 1mol of the phosphor to be obtained. The baked materials was washed thoroughly with water to remove the flux component, and then dried to obtain scintillator powder.

The scintillator powder obtained in this manner was press molded and, then, the molded material was subjected to hot pressing under the condition of 1500° C. and 300 atm. to obtain sintered body having a composition of $(Gd_{0.998}Ce_{0.002})_3Al_3Ga_2O_{12}$.

A detector was produced by using the scintillator (thickness of 2.5 mm) together with a photodiode, and placed at a distance of 15 cm from an X-ray source (120 kV, 0.5 mA), and its luminous output was measured.

Figure 6:
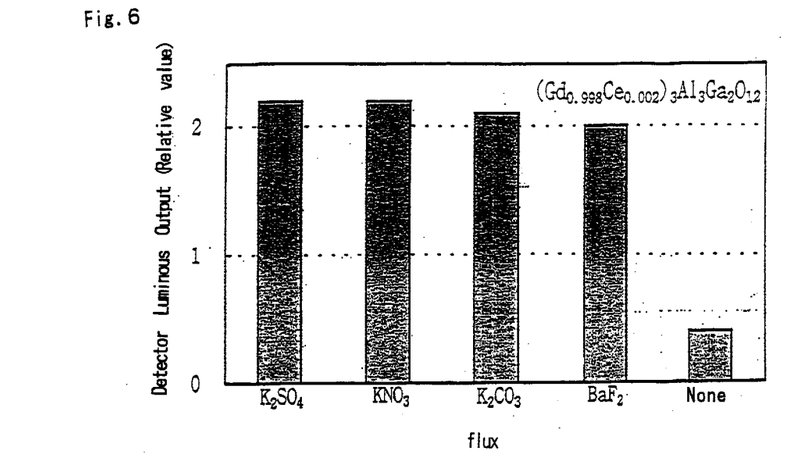
FIG. 6 is a graph showing how detector luminous output varies with kinds of flux components added during production of the phosphor of the present invention.

The results are shown in FIG. 6, where ordinate is the luminous output represented with relative values based on the luminous output of the $CdWO_4$ detector defined to be 1. The luminous output of the detector obtained in Example 3, which used a scintillator having the same composition (but used $BaF_2$ as a flux component), is also shown in the figure.

Example 5, 6

$Gd_2O_3$, $Ce_2(C_2O_4)_3 \cdot 9H_2O$, $Al_2O_3$ and $Ga_2O_3$ were used as raw materials, and sintered bodies having a composition of $(Gd_{0.998}Ce_{0.002})_3Al_3GaO_{12}$ were produced in the same manner as in Example 4 except that another flux component, potassium nitrate (Example 5) or potassium carbonate (Example 6), was used. The potassium nitrate was used in an amount of 1 mol per 1 mol of the phosphor to be obtained and the potassium carbonate was used in an amount of 0.5 mol.

Using each sintered body, a detector was produced similarly to Example 4 and its luminous output was measured. The results are shown in FIG. 6.

Comparative Example 3

$Gd_2O_3$, $Ce_2(C_2O_4)_3 \cdot 9H_2O$, $Al_2O_3$ and $Ga_2O_3$ were used as raw materials, and sintered body having a composition of $(Gd_{0.998}Ce_{0.002})_3Al_3Ga_2O_{12}$, was produced in the same manner as in Example 4 except that the flux component was not used. A detector was produced similarly to Example 4 using this sintered body and its luminous output was measured. The results are shown in FIG. 6.

As clearly seen from the results shown in the figure, high luminous output was obtained in the sintered body which was produced after baking with a flux component. Particularly, when potassium salt was used as the flux component, the luminous output was higher (about 2.2 times that of $CdWO_4$) than in a case that $BaF_2$, a flux generally used for such as YAG-system phosphors, was used.

Example 7

Figure 7:
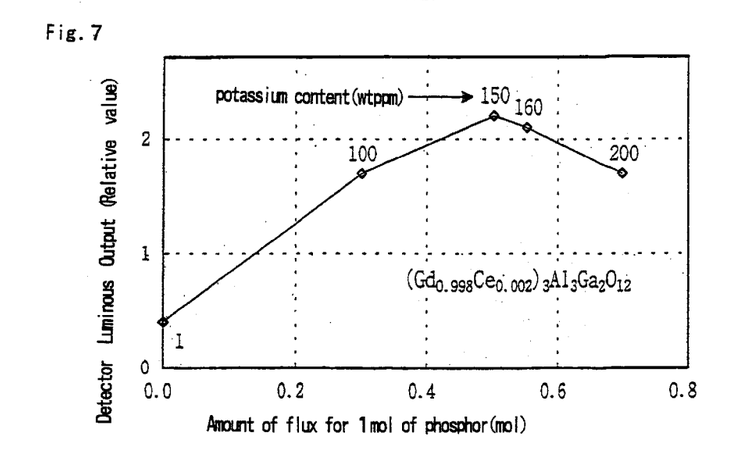
FIG. 7 is a graph showing how detector luminous output varies with the flux (potassium sulfate) amount.

Sintered bodies having a composition of $(Gd_{0.998}Ce_{0.002})_3Al_3Ga_2O_{12}$ were produced using potassium sulfate as a flux in the same manner as in Example 4 while changing an amount of the flux component. Potassium content was analyzed for the obtained sintered bodies. Using each sintered body, a detector was produced similarly to Example 4 and its luminous output was measured. The results are shown in FIG. 7. In the figure, numbers indicated at each point on the graph represent the potassium content (wtppm).

As clearly seen from the figure, the potassium content increased approximately linearly as more was added and when the content was in the range of 100–200 wtppm, luminous output 1.5 times or more than that of $CdWO_4$ was obtained. Particularly, it showed 2 times or more with the potassium content around 150 wtppm.

Example 8

Figure 8:
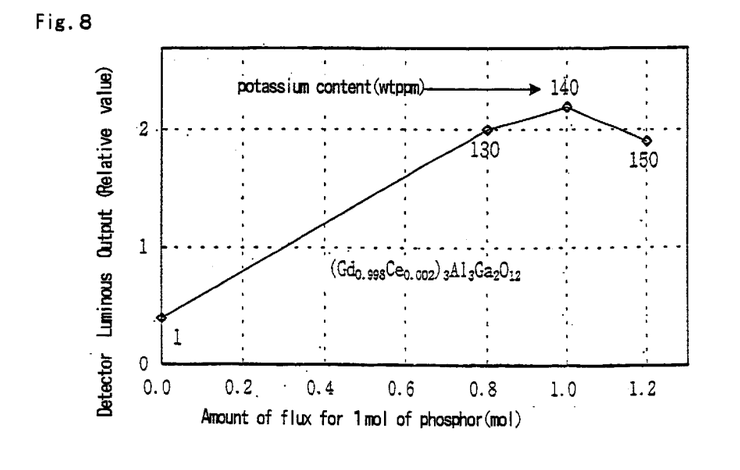
FIG. 8 is a graph showing how detector luminous output varies with the flux (potassium nitrate) amount.

Sintered bodies having a composition of $(Gd_{0.998}Ce_{0.002})_3Al_3Ga_2O_{12}$ were produced using potassium nitrate as a flux in the same manner as that of Example 4 while changing an amount of the flux component. Potassium content was analyzed for the obtained sintered bodies. Using each sintered body, a detector was produced similarly to Example 4 and its luminous output was measured. The results are shown in FIG. 8. In the figure, numbers indicated at each point on the graph represent the potassium content (wtppm).

As clearly seen from the figure, similarly to Example 7 in which potassium sulfate was used, when potassium nitrate was used as the flux component, high luminous output was obtained with the potassium content of 100 wtppm or more. Particularly, it showed about 2 times or more than that of $CdWO_4$ with the potassium content around 130–150 wtppm.

Industrial Applicability

According to the present invention, there is provided a phosphor having a composition of $(Gd_{1-z-x}L_zCe_x)_3Al_3Ga_yO_{12}$ and showing high luminous efficiency and very short afterglow. According to the present invention, there is also provided a sintered body having the aforementioned composition and high optical transmittance. A radiation detector comprising this sintered body in combination with a silicon photodiode advantageously shows markedly increased luminous output compared with a conventional detector.

What is claimed is:

1. A phosphor obtained by press molding a starting material powder and sintering the molded material, and represented by the general formula wherein L represents La or Y, and x, y and z are values falling in the ranges of $0.0005 \leq x \leq 0.02$, $0 < y < 5$, and $0 < z < 0.2$.

2. A phosphor obtained by baking a starting material powder with flux components to obtain scintillator powder, press molding the scintillator powder, and sintering the molded material, and represented by the general formula wherein L represents La or Y, and x, y and z are values falling in the ranges of $0.0005 \leq x \leq 0.02$, $0 < y < 5$, and $0 \leq z < 0.2$.

3. The phosphor of claim 2, wherein the flux components are potassium compounds.

4. The phosphor of claim 3, wherein the potassium compound is selected from a group of potassium sulfate, potassium nitrate and potassium carbonate.

5. The phosphor of claim 2, wherein the phosphor contains potassium in an amount of 10 wtppm or more but no more than 500 wtppm.

6. The phosphor of claim 3, wherein the phosphor contains potassium in an amount of 10 wtppm or more but no more than 500 wtppm.

7. The phosphor of claim 4, wherein the phosphor contains potassium in an amount of 10 wtppm or more but no more than 500 wtppm.

8. A radiation detector comprises a ceramic scintillator and a photodetector for detecting scintillator emission, wherein said ceramic scintillator comprises a phosphor represented by the general formula wherein L represents La or Y, and x, y and z are values falling in the ranges of $0.0005 \leq x \leq 0.02$, $0 < y < 5$, and $0 < z < 0.2$.

9. The radiation detector of claim 8, wherein the photodetector is a photodiode.

10. An X-ray CT apparatus comprising an X-ray source, an X-ray detector disposed facing the X-ray source, a revolving unit for holding the X-ray source and the X-ray detector and revolving them about the object to be examined, and image reconstruction means for reconstructing a tomographic image of the object based on the intensity of the X-rays detected by the X-ray detector, wherein the X-ray detector is a radiation detector of claim 8.

* * * * *